United States Patent Office 3,061,651
Patented Oct. 30, 1962

3,061,651
MANUFACTURE OF PHENOLS BY DECARBOXYLATION OF SALICYLIC ACIDS
Warren William Kaeding, Concord, Calif., assignor to The Dow Chemical Company, Midland, Mich., a corporation of Delaware
No Drawing. Filed Feb. 20, 1961, Ser. No. 90,183
13 Claims. (Cl. 260—621)

This invention relates to an improved process for the manufacture of phenols. It relates more particularly to a continuous process whereby salicylic acids are catalytically decarboxylated to the corresponding phenols.

The reaction whereby hydroxylated benzoic acids are decarboxylated by heat to form the corresponding phenolic compounds has long been known. It is also known that some metals and their salts act as catalysts to promote this reaction. The reaction has been carried out both in the absence and in the presence of a solvent. Certain disadvantages and difficulties are encountered in all these known processes. For example, when no solvent is used, the product must either be distilled from a solid residue, never an attractive procedure on a large scale, or it must be extracted from the reaction mixture, in effect adding two steps to the process, since the product must be separated from the extract. Brown et al., J. Chem. Soc. 1950, 778, decarboxylated various hydroxybenzoic acids by heating them in resorcinol solution in the absence of a catalyst, presumably to the corresponding phenols, although there is no indication what yields of products and byproducts may have been obtained. Moreover, resorcinol is subject to thermal and oxidative degradation and is not suited for large scale nor extended use. In most known methods of carrying out the decarboxylation reaction, there is produced not only the desired phenolic product but also a variety of contaminating byproducts and products of decomposition. None of the processes described is easily convertible to a continuous mode of operation.

The present invention resides in the discovery that salicylic acids are decarboxylated to the corresponding phenols by contacting said acids with a molten non-hydroxylated benzoic acid having dissolved therein a catalytically effective amount of any of certain metal benzoates. I have found that my process makes it possible to carry out the reaction at a high rate with nearly quantitative yields of the desired phenol and in a continuous manner suitable for large scale production.

Non-hydroxylated benzoic acids suitable for use as solvents in my process include benzoic acid itself and alkylated benzoic acids such as toluic acid, tert-butylbenzoic acid, and the like. These acids, when molten, are not only capable of dissolving appreciable quantities of their metal salts which act as catalysts in the reaction, but they are also stable and non-reactive under the conditions of the process. It is particularly surprising to find that these acids are not themselves decarboxylated in the process. It is important that the benzoic acid solvent be stable at its boiling point which is preferably substantially above that of the phenol produced in order to facilitate the separation of the phenol by distillation in the course of the process. The benzoic acid suitably has a melting point of about or somewhat below 150° C. for convenience in operation.

Salicylic acids which may be decarboxylated in my process include salicylic acid, cresotic acid, and other alkyl substituted salicylic acids such as tert-butylsalicylic acid, isopropylsalicylic acid, octylsalicylic acid and the like, these being converted efficiently to the corresponding phenols, that is, phenol, cresol, and the corresponding alkyl substituted phenols.

The temperature at which my process operates depends upon the particular phenol being produced and the benzoic acid solvent, the temperature lying in the approximate range of about 180° C. to about 250° C. The temperature is preferably somewhat above both the melting point of the benzoic acid solvent and the boiling point of the phenol product. In the case where phenol is made by decarboxylation of salicylic acid in molten benzoic acid, for example, the preferable temperature is between about 200° C. and about 220° C. By having the reaction temperature above the boiling point of the phenol produced in the manner described, the phenol is thus separated by distillation substantially as it is formed. It is advantageous to have a stream of inert gas, preferably nitrogen, passing through the reaction mixture during the process. This gas, together with the carbon dioxide produced in the reaction, helps to sweep the phenol being produced out of the reaction vessel and into a condensing apparatus where it may be recovered.

Metal benzoates found to be catalytically effective in the decarboxylation reaction include those of nickel, zirconium, cobalt, magnesium, cerium, manganese, potassium, cesium, strontium, barium, and sodium. These benzoates may be prepared separately and added to the benzoic acid solvent or the metal oxide, hydroxide, carbonate, or like salt may be added to the benzoic acid, whereupon the benzoate is formed when the acid is melted.

Any amount of metal benzoate may be used up on the limit of its solubility in the acid at the reaction temperature, so long as there is enough of the salt present to be catalytically effective. I have found a concentration of about 0.12 g. mole of benzoate per kilogram of benzoic acid to be a convenient amount.

My process is preferably carried out in a continuous manner by adding a solid salicylic acid at a more or less constant rate to a molten benzoic acid of the type described above having dissolved therein a catalytically effective amount of a metal benzoate at a temperature of about 180–250° C. The solid addition is suitably accompanied by a stream of nitrogen passing through or over the molten reaction mixture, thus sweeping the liberated phenol vapors out of the reaction vessel substantially as the phenol is formed. Preferably, this mixture of gas and vapors is passed through a distillation column and fractional distillation head, thereby purifying the vaporized phenol by fractional distillation and yielding the product of the reaction as the substantially pure phenol. Example 1 illustrates the way in which this process is applied to the production of phenol from salicylic acid.

EXAMPLE 1

A reactor flask equipped with a gas inlet tube, a one inch opening to which was connected means for continuously adding a solid feed, and connected to a distillation column, was loaded with 1500 g. of benzoic acid and 25 g. of magnesium oxide. Heat was applied to the flask to melt the benzoic acid, whereupon the magnesium oxide reacted to form magnesium benzoate and water, the latter being allowed to vaporize and escape. When the benzoic acid solution had been heated to 220° C., solid salicylic acid was added to the flask at an average rate of 5 grams per minute. The phenol which formed as the salicylic acid was added, distilled from the reaction mixture essentially as it formed and was taken off through the distillation column. A slow stream of nitrogen introduced into the reaction mixture through the gas inlet tube assisted in the removal of the phenol product from the reaction mixture. After equilibrium had been established and column inventory was constant, 96% of the theoretical amount of phenol was obtained as a pure product during one hour's running under these conditions.

Reaction rate studies indicate that the rate is directly proportional to the concentration of the metal benzoate catalyst in the benzoic acid solvent. Reaction rates were determined by heating a particular concentration of salicylic acid in benzoic acid containing varying amounts of magnesium benzoate and measuring the quantity of carbon dioxide evolved over an interval of time. The reaction rate constant $k$ is defined by the equation $$k = \frac{1}{(Sal)} \times \frac{d(Sal)}{dt}$$

where (Sal) is the initial concentration of salicylic acid in benzoic acid, expressed as gram moles per kilogram of benzoic acid. The rate constant was determined graphically by plotting log (Sal) against time in minutes and multiplying the slope of the straight line obtained by 2.303. The results of a series of determinations run at 212° C. are shown in Table 1.

*Table 1*

| Salicylic Acid, Initial Conc. | Mg Benzoate | $k$ | $\frac{k}{0.0018}$ |
|---|---|---|---|
| 0.724 | 0 | 0.0018 | 1 |
| 0.724 | 0.030 | 0.0111 | 6.2 |
| 0.725 | 0.062 | 0.0195 | 10.8 |
| 0.724 | 0.090 | 0.0274 | 15.2 |
| 0.726 | 0.120 | 0.0320 | 17.8 |

The concentration of the magnesium benzoate is listed as gram moles per kilogram of benzoic acid as is the initial concentration of the salicylic acid. The reaction rate constant determined with no catalyst present had been found to remain of constant value at various initial concentrations of salicylic acid at the same temperature.

A series of determinations of rate constants using different metal benzoate catalysts was run under the same conditions as the experiments whose results are shown in Table 1. The catalyst concentration in each case was 0.120 gram mole per kilogram of benzoic acid. The results obtained, indicating the relative activity of the various metal benzoates as catalysts for the reaction are shown in Table 2.

*Table 2*

| Metal Benzoate | Rate $k$ | $\frac{k}{0.0018}$ |
|---|---|---|
| Ni | 0.0461 | 25.6 |
| Zr | 0.0380 | 21.1 |
| Co | 0.0377 | 20.9 |
| Mg | 0.0320 | 17.8 |
| Ce | 0.0307 | 17.1 |
| Mn | 0.0290 | 16.1 |
| K | 0.0290 | 16.1 |
| Cs | 0.0289 | 16.1 |
| Sr | 0.0235 | 13.1 |
| Ba | 0.0203 | 11.3 |
| Na | 0.0193 | 10.7 |

I claim:
1. A process for making phenols by the catalytic decarboxylation of salicylic acids, which process comprises contacting a salicylic acid with a molten non-hydroxylated benzoic acid having dissolved therein a catalytically effective amount of a metal benzoate at a temperature of about 180° C. to about 250° C., said metal selected from the group consisting of nickel, zirconium, cobalt, magnesium, cerium, manganese, potassium, cesium, strontium, barium, and sodium, said benzoic acid having a boiling point substantially above that of the phenol produced.

2. A process as described in claim 1 wherein a salicylic acid is introduced continuously into the molten benzoic acid solution and the solution is maintained at a temperature such that the phenol produced is continuously separated by distillation substantially as it is formed.

3. A process as described in claim 2 wherein the metal benzoate is nickel benzoate.

4. A process as described in claim 2 wherein the metal benzoate is zirconium benzoate.

5. A process as described in claim 2 wherein the metal benzoate is magnesium benzoate.

6. A process as described in claim 2 wherein the metal benzoate is manganese benzoate.

7. A process as described in claim 2 wherein the metal benzoate is potassium benzoate.

8. A continuous process for making phenol, which process comprises contacting salicylic acid with molten benzoic acid having dissolved therein a catalytically effective amount of a metal benzoate, said metal selected from the group consisting of nickel, zirconium, cobalt, magnesium, cerium, manganese, potassium, cesium, strontium, barium, and sodium, at a temperature of about 200° C. to about 220° C., and continuously separating the phenol product by distillation from the molten benzoic acid solution substantially as said phenol is formed.

9. A process as described in claim 8 wherein the metal benzoate is nickel benzoate.

10. A process as described in claim 8 wherein the metal benzoate is zirconium benzoate.

11. A process as described in claim 8 wherein the metal benzoate is magnesium benzoate.

12. A process as described in claim 8 wherein the metal benzoate is manganese benzoate.

13. A process as described in claim 8 wherein the metal benzoate is potassium benzoate.

References Cited in the file of this patent
UNITED STATES PATENTS 2,929,821     Hoeksema et al.     Mar. 22, 1960

FOREIGN PATENTS 108,938     Great Britain     Aug. 30, 1917
735,300     Great Britain     Aug. 17, 1955